United States Patent [19]

Toms, Jr.

[11] Patent Number: 4,756,512
[45] Date of Patent: Jul. 12, 1988

[54] HEAVY OFF-ROAD LARGE VEHICLE SUSPENSION STRUT

[75] Inventor: Robert S. Toms, Jr., Warrenville, Ill.

[73] Assignee: Miner Enterprises, Inc., Geneva, Ill.

[21] Appl. No.: 941,660

[22] Filed: Dec. 15, 1986

[51] Int. Cl.⁴ ............................................. F16F 1/34
[52] U.S. Cl. .................................... 267/70; 92/128; 188/284; 267/141.1; 267/153
[58] Field of Search .................. 267/139, 63 R, 141.1, 267/153, 70, 71, 72; 188/322.19, 322.22, 284; 92/128, 169

[56] References Cited

U.S. PATENT DOCUMENTS

| | | | |
|---|---|---|---|
| 2,091,679 | 8/1937 | Grant | 267/141.1 |
| 3,444,965 | 5/1969 | Dobkins | 188/282 |
| 3,491,993 | 1/1970 | Scholin et al. | 267/126 |
| 3,724,681 | 4/1973 | Anderson et al. | 213/43 |
| 3,749,255 | 7/1973 | Cope | 213/8 |
| 3,851,768 | 12/1974 | Hawthorne | 213/43 |
| 3,920,274 | 11/1975 | Fannin | 267/139 |
| 3,976,287 | 8/1976 | Kendall et al. | 267/139 |
| 4,078,638 | 3/1978 | Koyama et al. | 188/288 |
| 4,261,471 | 4/1981 | Reinhardt et al. | 213/10 |
| 4,405,119 | 9/1983 | Masclet et al. | 267/64.22 |
| 4,428,565 | 1/1984 | Stiefel et al. | 267/9 A |

FOREIGN PATENT DOCUMENTS

| | | | |
|---|---|---|---|
| 0019533 | 11/1980 | European Pat. Off. | 267/141.1 |
| 0126645 | 11/1949 | Sweden | 188/284 |

Primary Examiner—George E. A. Halvosa
Assistant Examiner—Matthew C. Graham

[57] ABSTRACT

A shock absorber strut that includes an inner and an outer tube which slide one over the other. The combination of a keeper ring and a series of key stops secures the tubes while allowing independent motion therebetween. An elastomeric material contained within the tubes functions as the shock absorber material and bearing surfaces allow for easy movement between the tubes. A method is also provided for replacement of one of the bearing surfaces without removal of the entire strut from the vehicle even though the elastomeric material is under preload.

5 Claims, 3 Drawing Sheets

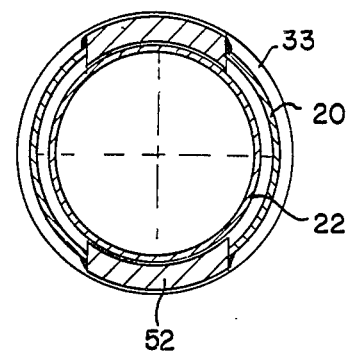
FIG_4.
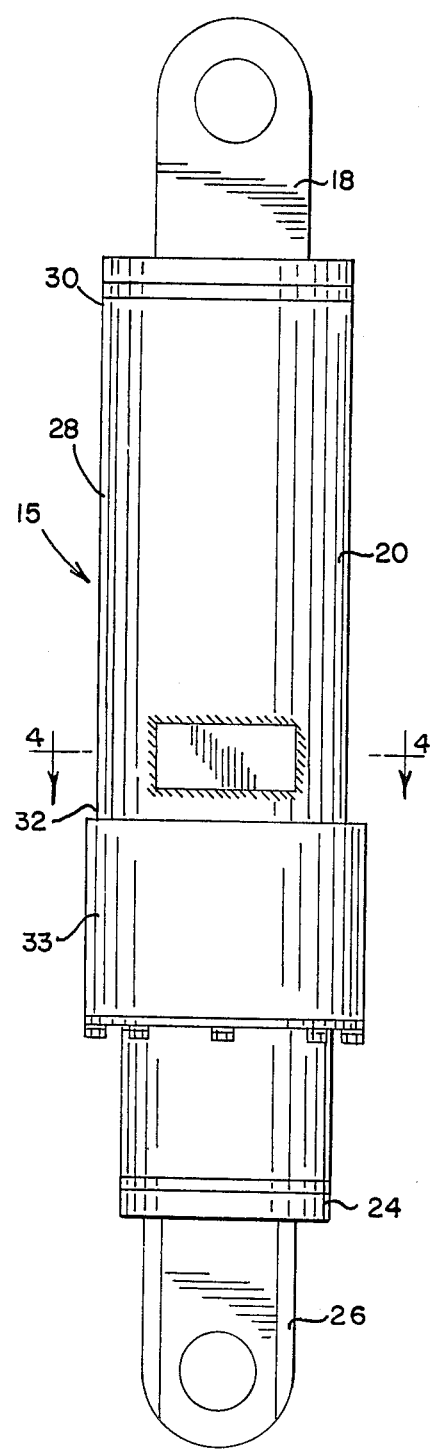
FIG_3.
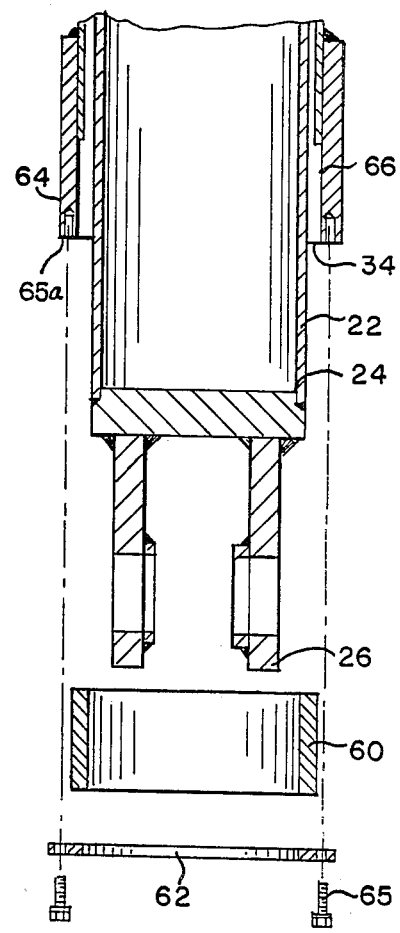
FIG_5.

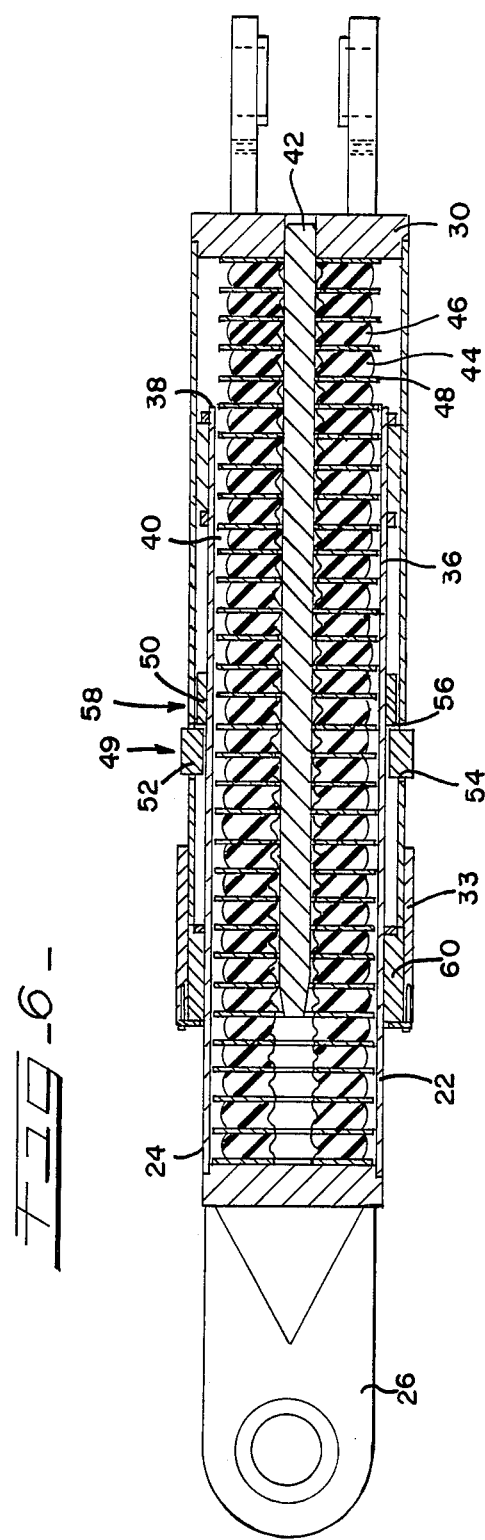

HEAVY OFF-ROAD LARGE VEHICLE SUSPENSION STRUT

BACKGROUND OF THE INVENTION

The field of this invention relates to shock absorber struts and more particularly to a very large heavy strut means where in the inner and outer tube assemblies can rotate independently in at least two different directions and to a method of replacing one bearing set thereof without removal from the truck.

Heavy off-road haulage trucks which are designed to carry loads in the range of from 35 to 220 tons because of necessity designed to employ some sort of shock absorber strut means. Such strut means is as apparent are massive in size, for example, a strut means for a 150 ton hauler weighs in the range of 1,100 to 1,200 lbs. and is approximately 7½ ft. long and 14 inches in diameter. A substantial number of such struts employ hydraulic principles to absorb the shock. Characteristically, they leak and require servicing. Invariably they must be removed entirely from the vehicle and taken to a repair shop, for example, for servicing, which, as appreciated because of their size, is very difficult. Another problem, and herein depending upon the shock absorber employed, whether it be hydraulic or of the elastomer nature, it can be subject to varying degrees to contamination. For example, in the mines very often there is substantial amounts of sulfur gases which attack elastomer material. Where dirt roads are employed, the fine powdered dust invades the moving parts and acts like a grinding material. Another difficulty which may cause premature failure of the shock absorber, depending on the type employed, has to do with the mechanism which holds the inner and outer tube assemblies together. As is apparent, the shock absorber strut should be able to not only move in both directions along its major axis but should have the freedom to rotate as well. That is, because of road conditions the inner tube assembly may move along the major axis and rotate to the right while the outer tube assembly was also moving along the major axis but rotating to the left. This action is particularly destructive to those type of struts which employ a cam and cam slot to hold the two assemblies together.

It is, therefore, a prime objective of the invention to provide a shock absorber strut means which is sealed against exterior contamination, can in part be serviced without removal from the vehicle and allows for both horizontal and rotational movement of the parts in different directions along the main axis. Yet another objective is the provision of a shock absorber strut which employs a compressible solid material and thus is not subjected to leakage.

SUMMARY OF THE INVENTION

The shock absorber strut of this invention includes an outer tube which has slidably carried therein partially an inner tube. The first ends of both tubes are open while both second ends are closed and terminate in an upper clevis and a lower clevis. Adjacent the open end of the inner tube is a first bearing means while adjacent the end of the outer tube is positioned a second bearing means whereby the two tubes can slide with respect to each other. The enclosed space formed by the overlap of the tubes is filled with a pad stack of a compressible solid material such as that sold by the Miner Enterprises, Inc. of Geneva, Illinois under the Trade Name "TecsPak" and more fully described in U.S. Pat. No. 4,198,037 issued Apr. 15, 1980 to Anderson.

In practice the enclosed space is filled with a pad stack of elastomeric material pads separated by steel plates, a guide rod being secured to the outer tube assembly runs down through the center of the stack to maintain stability through a substantial amount of the pad stacks length yet terminating at a point away from or above the closed end of the inner tube. In order to accomplish the securement of the inner and outer tubes such that a preload can be maintained upon the elastomer stack and yet allow movement along the major axis as well as around thereof, a keeper ring is secured to the inner tube assembly and key stops are secured to the outer tube assembly. The keeper ring is a large steel ring which runs 360 degrees around the tube assembly and is permanently secured thereto. The key stops are steel blocks that fit through apertures in the outer tube assembly and cooperate with the keeper ring to form a bearing surface therebetween.

In actual operation, it has been found that the lower bushing ring which is adjacent the bottom of the outer tube assembly is more susceptible to wear than the upper bushing ring. Thus, in the field, because the upper clevis is secured to the main frame of the truck it is possible to disconnect the lower clevis from the axle means, and jack up the rear of the main frame sufficient to swing the entire strut means out for servicing. In this position it is a simple matter to remove the bolts and plate which hold the worn lower bushing in place and drop it out around the inner tube assembly and lower clevis. The new lower bushing is then slipped up into position, the plate and bolts are reattached, the shock absorber strut is swung inwardly to mate with the axle and the main frame is slowly lowered until alignment of the bolt holes is achieved and secure attachment can take place.

DESCRIPTION OF THE DRAWINGS

FIG. 3 is a plan view of the shock absorber strut means shown in FIGS. 1 and 2;

FIG. 4 is a sectional taken generally along lines 4—4 of FIG. 3 showing the relationship of the key stops and keeper ring;

FIG. 5 is a partial exploded view of the lower clevis, bottom end of the inner tube showing the removal of the lower bushing ring; and FIG. 6 is a cross-sectional of the shock absorber strut means shown in FIG. 3 showing the center guide rod and the stack of elastomeric material pads.

DESCRIPTION OF THE PREFERRED EMBODIMENT

Figure 1:
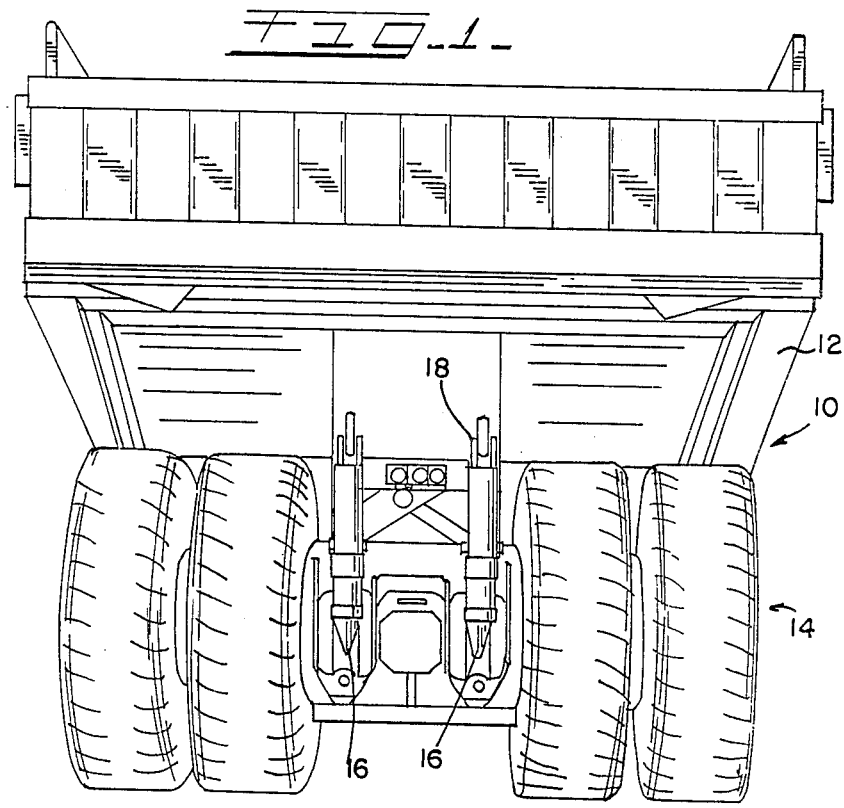
FIG. 1 is a rear view of a heavy off-road haulage truck showing the shock absorber strut means with the upper clevis secured to the main frame of the truck and the lower clevis secured to the axle system.

Referring to the drawings and particularly to FIG. 1 there is shown the rear of a heavy off-road haulage truck 10. For the sake of simplicity the truck will essentially be considered to consist of two main groups of components. The first, the main frame means 12, which include generally the frame, the cab, the engine, etc. and the axle means 14 which includes the axles, tires, the differential, etc. Normally, between these two main groups of components are the shock absorber strut means 16. It should be understood that there are two shock absorber strut means in the front of the truck similarly located as well as two in the rear. For all practical purposes all four struts are essentially the same and therefore discussion will be limited to one strut with the understanding that it applies equally well to all struts. In actual operation the upper clevis means 18 is pivotally secured to the main frame means 12. The upper clevis means 18 is a part of the upper tube assembly 20 that slidingly receives the inner tube assembly means 22. At the first end means 24 of the inner tube 22 is connected a lower clevis end means 26 which in turn is connected to the axle system means 14. Any suitable connection means can be employed and in the embodiment shown, a bolt is employed for the connection.

Turning now to a consideration of FIGS. 3, 4, 5 and 6, a description of the actual shock absorber strut means 15 will be undertaken. As shown and as previously described, the strut means 15 includes an outer tube assembly 20 which has a generally cylindrical body portion means 28, first and second end means 30 and 32. The upper or first end means 30 is sealed and carries the upper clevis means 18 while carried off the second end 32 is a lower bushing housing means 33. It generally encircles said inner tube assembly means 24 while providing a predetermined gap 34 therebetween. The inner tube assembly means 22 as shown in FIG. 6 generally includes a cylindrical body portion means 36 having a first open end means 38 and a second closed end means 24. As previously stated, the second closed end means 24 is secured and carries the lower clevis end means 26.

The inner and outer tube assembly means slidably fit one within the other whereby defining a closed space 40 therebetween. A center guide rod means 42 is secured to the first end 30 of the outer tube assembly 28 and extends generally along the major axis of the strut means 15 through said enclosed space 40 terminating at a point away from said first end means 24 of said inner tube assembly means 22. A compression material pad stack means 44, is journaled by said center guide rod through its entire height, and substantially fills said enclosed space 40. In practice, a gap is provided between the pad stack and the guide rod whereby it floats therein. As previsouly stated, the pad stack means 44 in the preferred embodiment is an elastomer compression spring sold under the Trademark "TecsPak" and consists of alternate layers of elastomer material 46 and steel plates 48.

In final assembled shock absorber strut, the pad stack 44 is subjected to a preload. In order to facilitate the preloading, as well as achieve a number of the other desirable features, a bearing system means 45, including a first and second bearing surface means 47 and 49. In this embodiment, the first bearing surface means 47 is a keeper ring menas 50 that is a steel ring which fits all the way around the inner tube means 22 and is affixedly secured thereto by whatever suitable means. The exact location of the keeper ring means 50 on the inner tube means 22 is dictated by a series of aperture means 54 located in the surface of the outer tube assembly means 28. The aperture means 54 are designed to receive the second bearing surface means 49 which in this embodiment is the key stop means 52. They are dropped thereinto while the strut is in a compressed state to achieve the desired preload and welded in place. The key stop means 52 and the keeper ring means 50 cooperate such that a bearing surface means 56 is created therebetween. As is apparent, the inner tube assembly can move along the major axis of the strut with respect to the outer tube assembly, or vice versa, and each tube assembly can rotate in a different direction as well because of teh provision of the bearing surface 56. An additional feature of the key stop 52 and keeper ring means 50 is that by proper dimensioning with respect to the outer tube 20, it creates a first seal means 58 to prevent the passage of dirt and abrasives to the upper bushing ring means 38 as well as the elastomer pad stack means 44.

As previously noted, carried off the end means 32 of outer tube assembly means 20 is a lower bushing housing means 33, being secured thereto by any suitable means. As a result of this cooperation, a predetermined gap means 34 is created of the particular dimensions and characteristics to receive a lower bushing ring means 60. In practice, once the lower bushing ring means 60 has been slid into the gas 34, a retainer plate means 62 is fastened to the bottom 64 of the lower bushing housing means 33. Any suitable means may be employed for the physical juncture such as the bolt means and threaded hole means 65 and 65a. It should be noted that the lower clevis 26, the end means 24 and the inner tube assembly means 22 have been dimensioned such that a lower busing ring means and retainer place means 62 can be slipped on and off therefrom. This allows quick simple efficient replacement of the lower bushing ring means 60 since it floats in teh gap means 34. Additionally the assemblage consisting of the lower bushing ring means 60, the retainer plate means 62 and the lower bushing housing means 33 constitute a second sealing means 66 which cooperates with said first sealing means 58 to prevent the passage of contaminates into the closed space means 40.

Figure 2:
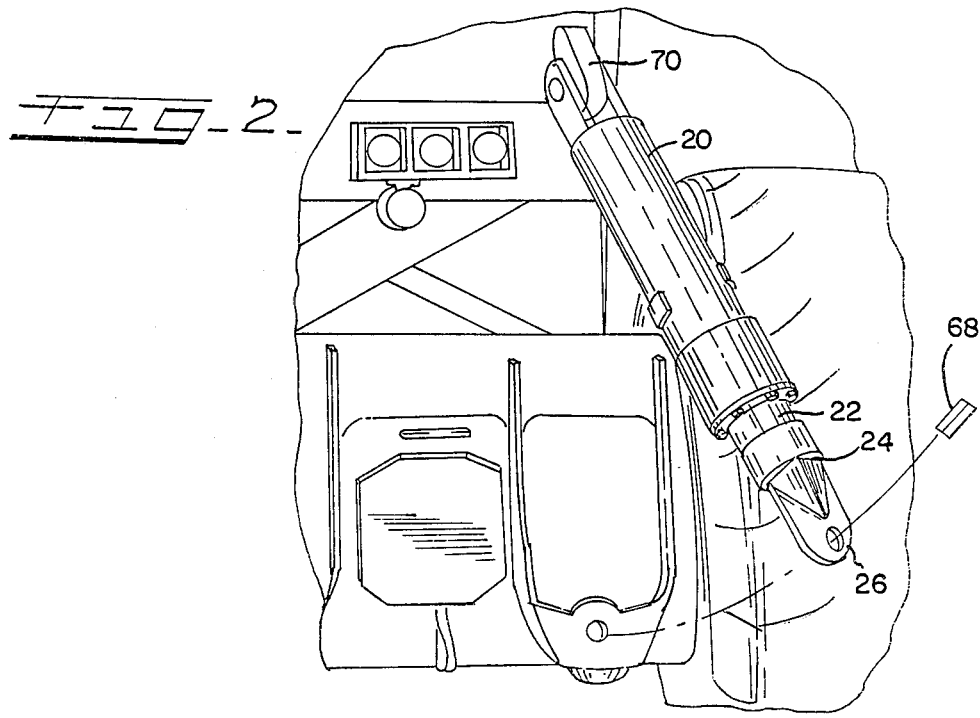
FIG. 2 is a partial view of the main frame axle system assembly and shock absorber strut in a pivot out position for replacement of the lower bearing set.

In actual operation, the replacement of the lower bushing ring means 60 is a relatively simple procedure as compared to the prior art devices. Referring to FIGS. 1 and 2, and as was previously stated, the main frame of the truck is elevated by whatever suitable manner such as a large jack (not shown). The main frame is raised to a point sufficient to just unload the bolt means 68 which attaches the clevis means 26 to the axle system means 14. Once this is accomplished, the entire shock absorber strut means 14 is swung out around the pivotal connection 70. The bolt means 65 are next unscrewed, the retainer plate 62 is dropped down and off, allowing the lower bushing ring means 60 to slide out of the space 34 and be replaced. The shock absorber strut means 14 is then pivoted back into position, the pin means 68 is reinserted, securing clevis means 26 to the axle system means 14. The jack is finally removed and the truck is available for service. As previously stated, the elastomer pad stack 44 is under a preload but removal of the lower bushing ring means 60 is still possible in this fashion because of the cooperation of the keeper ring means 50 and the key stop means 52 which provide a bearing surface means 56 regardless of the relative orientations of the outer tube assembly means 20 to the inner tube assembly means 22.

Having thus described the invention in detail and with sufficient particularlity as to enable those skilled in the art to practice it, what is desired to have protected by Letters Patent is set forth in the following claims.

The embodiment of the invention in which an exclusive property or privilege is claimed are defined as follows.

I claim:

1. A shock absorber strut means secured to the body of heavy off-road haulage vehicle comprising:
   an outer tube assembly means including:
   a generally cylindrical body portion means having first and second end means, and having at least two aperture means located in said cylindrical body portion means, said first end means having an upper clevis end means which is pivotally secured to said body of said vehicle, said second end means being open;
   an inner tube assembly means including:
   a generally cylindrical body portion means having first and second end means, said first end means having a lower clevis end means and said second end means being open, said inner tube assembly means being slidably fitted within said outer tube assembly means;
   a center guide rod means, secured to said first end means of said cylindrical body portion means of said tube assembly means whereby said center guide rod means extends generally down the center of said outer tube assembly means and said inner tube assembly means terminating at a point away from said first end means;
   a compressible material means journaled by said center guide rod means and partially filling the enclosed space created by said inner and outer tube assembly means, said compressible material means being subjected to a preload;
   a keeper ring means secured to and encircling said inner tube assembly means and dimensioned with respect to said outer tube assembly to create a first seal means;
   key stop means removably secured in said aperture means of said outer tube assembly means in an abutting relationship with said keeper ring means whereby a bearing surface is created therebetween such that the inner tube assembly means is locked within said outer tube assembly means so that movement along and around the major axis of the shock absorber means can take place therebetween and said enclosed space is generally sealed;
   an upper bushing ring means encircling said second end means of said inner tube assembly means and being secured thereto;
   a lower bushing ring means encircling said inner tube assembly means adjacent said first end means; and
   a lower bushing housing means secured to said second end means of said outer tube assembly means thereby encircling said lower bushing ring means.

2. The shock absorber strut of claim 1 including:
   a second sealing means consisting of said lower bushing ring means, a retainer plate means and said lower bushing housing means, said retainer plate means being removably secured to said lower bushing housing means whereby said lower bushing ring means is removable.

3. A shock absorber strut means secured between the body and the axle of a heavy off-road haulage truck comprising:
   a inner and an outer tube means which are slidable relatively to each other, whereby defining a closed space, said inner tube means being movable within said outer tube means, said outer hollow slidable means being secured to the body of said truck and said inner hollow slidable means being secured to an axle thereof;
   a center guide rod means secured to said outer tube means and extending generally through said closed space;
   a compressible material journaled by said center guide rod and filling generally said enclosed space;
   a first bearing surface means being secured to and encircling said inner tube means, said first bearing surface means being a keeper ring;
   a second bearing surface means secured to said outer tube means and cooperating with said first bearing surface means whereby horizontal and rotational movement between said inner and outer tube means is possible, said second bearing surface means being a key stop means said key stop means being removably secured in aperture means in said outer tube means;
   a first bushing means secured around said inner tube away from said axle;
   a lower bushing housing means secured to said outer tube means and extending out therefrom encircling said inner tube means and defining a gap therebetween;
   a second bushing means removable carried within said gap; and
   a plate means removably secured to said lower bushing housing means whereby said shock absorber strut means may be disconnected from said axle and pivoted on said body to allow removal and replacement of said second bushing means.

4. The shock absorber strut means of claim 3 wherein:
   said keeper ring means and sad key stop means cooperate to maintain a preload condition on said compressible material means.

5. The shock absorber strut means of claim 4 wherein:
   said keeper ring means is dimensioned with respect to said outer tube means to create a first seal means; and
   said lower bushing ring means, said plate means and said lower bushing housing means are dimensioned to create a second seal means.

* * * * *